United States Patent
Yamashiroya

(12) 
(10) Patent No.: US 6,647,463 B2
(45) Date of Patent: Nov. 11, 2003

(54) CACHE UPDATE METHOD AND CACHE UPDATE CONTROL SYSTEM EMPLOYING NON-BLOCKING TYPE CACHE

(75) Inventor: Atsushi Yamashiroya, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/945,632

(22) Filed: Sep. 5, 2001

(65) Prior Publication Data

US 2002/0032841 A1 Mar. 14, 2002

(30) Foreign Application Priority Data

Sep. 8, 2000 (JP) ........................................ 2000-272859

(51) Int. Cl.[7] .............................................. G06F 12/00
(52) U.S. Cl. ........................ 711/118; 711/152; 711/158; 711/167; 711/168
(58) Field of Search ................................. 711/140, 137, 711/163, 168, 169, 118, 136, 167, 158, 152, 151

(56) References Cited

U.S. PATENT DOCUMENTS

| | | | | |
|---|---|---|---|---|
| 5,555,392 A | * | 9/1996 | Chaput et al. | 711/118 |
| 5,623,628 A | * | 4/1997 | Brayton et al. | 711/141 |
| 5,680,572 A | | 10/1997 | Akkary et al. | |
| 5,826,109 A | | 10/1998 | Abramson et al. | |
| 6,148,372 A | * | 11/2000 | Mehrotra et al. | 711/122 |
| 6,226,713 B1 | * | 5/2001 | Mehrotra | 711/118 |
| 6,249,851 B1 | * | 6/2001 | Richardson et al. | 711/167 |

FOREIGN PATENT DOCUMENTS

| | | |
|---|---|---|
| JP | 63-234336 | 9/1988 |
| JP | 7-69862 | 7/1995 |
| JP | 7-219845 | 8/1995 |
| JP | 8-55061 | 2/1996 |
| JP | 2000-90007 | 3/2000 |

OTHER PUBLICATIONS

Jim Handy, "The Cache Memory Book", 1993, Academic Press, pp 37–107.*
European Search Report dated Nov. 29, 2002.
David Kroft, "Lockup–Free Instruction Fetch/Prefetch Cache Organization" Proceedings of the 8th Annual Symposium on Computer Architecture, May 12–14, 1981, pp. 81–87.
Samson Belayneh and David R. Kaeli, "A Discussion on Non–Blocking/Lockup–Free Caches", Northeastern University, Department of Electrical and Computer Engineering, Boston, MA, pp. 18–25.

* cited by examiner

Primary Examiner—Hong Kim
(74) Attorney, Agent, or Firm—McGinn & Gibb, PLLC

(57) ABSTRACT

If a cache miss occurs at a time of a load request from a processor core, an issuance check block issues a request of reading out data caused by the cache miss, to a main memory from an issuance control circuit, and then registers the information of the request in a request buffer circuit. A cache block does not update an address array at that time, and it is processed as a cache hit if a following instruction is hit to an address stored in an entry of an update schedule. The update of the address array is done simultaneously with the update of a data array when responsive data is received from the main memory with regard to said request. Accordingly, it is possible to provide a new cache update method, in which the feature of a cache of a non-blocking type can be sufficiently used, such as the merit of continuing a process for a following instruction even while the request of reading out the data caused by the cache miss is sent to the main memory.

17 Claims, 14 Drawing Sheets

Fig. 2

CACHE UPDATE METHOD AND CACHE UPDATE CONTROL SYSTEM EMPLOYING NON-BLOCKING TYPE CACHE

BACKGROUND OF THE INVENTION

1. Field of the Invention

The present invention relates to a cache update method and a cache update control system. More particularly, the present invention relates to a method of updating an address array in a cache of a non-blocking type.

2. Description of the Related Art

Typically, in a current computer system, a cache having a high speed and a small capacity is mounted between a processor core and a main memory so that an access to data stored in the main memory can be made faster. FIG. 1 schematically shows a cache of a set associative type mainly used today. The illustrated cache has the simplest 1-WAY configuration in the set associative types.

In FIG. 1, a data array (DA) 11 holds a copy of a part of main memory data, at a block unit (128 bytes in the example of FIG. 1), and an address array (AA) 12 stores an address of a data block stored in the data array 11. Each of the data array 12 and the address array is constituted by 256 entries in the example of FIG. 1. Also, the cache has a comparator 13 for judging a hit or miss. A main memory address indicated by a load instruction (LD) serving as a read instruction to the main memory is conveniently divided into a tag address, an index address and a block address in order from the higher location in the case of the access to the cache. In the example of FIG. 1, the block address is composed of 4 bits, the index address is composed of 8 bits, and the tag address is composed of the remaining bits in the main memory address.

When the load instruction is executed, the index address is extracted from the load instruction, and one entry of the address array 12 is specified by the index address. Then, the comparator 13 compares whether or not a tag address stored in the specified entry coincides with a tag address in the load instruction. Typically, an effectiveness indication bit (not shown) indicating whether or not the tag address stored in the entry is effective is provided in each entry of the address array 12. The effectiveness indication bit is investigated simultaneously with the comparison between the tag addresses.

A state at which the effectiveness indication bit indicates effective and the coincident between both the tag addresses is detected is referred to as a cache hit, or simply referred to as a hit, and another state except above state is referred to as a cache miss, or simply referred to as a miss. In the case of the cache hit, data of the 8 bytes within the entry in the data array (DA) 11 specified by the portion of the index address and the block address of the load instruction are read out as cache data, and sent to a process core as reply data.

On the other hand, in the case of the cache miss, a miss request is sent to the main memory, in accordance with the main memory address indicated by the load instruction, and a block of 128 bytes containing the 8-byte data corresponding to the address is read out from the main memory, and the 8-byte data corresponding to the address in the block of 128 bytes is returned back to the processor core. Also, the tag address of the load instruction is registered in the entry of the address array 12 in which entry missed address is stored, and further the block of the 128 bytes read out from the main memory is stored in the entry of the data array 11.

As described above, in the conventional technique, as for an update of the cache in the case of the miss, when the miss request is issued to the main memory, the index address is registered in the address array 12, and when block data is sent from the main memory with regard to the issued miss request, the data array 11 is updated. As a document disclosing such a cache update method, for example, there is Japanese Examined Patent Application (JP-B-Heisei, 7-69862) (in particular, third to 31-th lines on a left column of a third page). The same cache update method is followed in its original state, in a cache of a non-blocking type developed in recent years.

The cache of the non-blocking type can continue a process for following instructions even while a request of reading out data caused by the cache miss is sent to the main memory. In short, in the conventional cache that is not the non-blocking type, in the case of the cache miss, the processor core must stop the process for the following instruction until the data is prepared. However, in the cache of the non-blocking type, an operation for reading out more than one piece of block data can be required to the main memory. Thus, the executing performance is improved correspondingly to it. An operation of the 1-WAY set associative cache shown in FIG. 1 will be explained as an example. When a cache miss occurs in a load instruction LDa having a certain index address INDEX1 a miss request is sent to the main memory. Then, a next load instruction LDb is processed without any stop of the process for the processor core. Hence, if the load instruction LDb has an index address except the INDEX1 and the index address hits a cache, the hit cache data is returned back to the process core as reply data with regard to the load instruction LDb.

However, in the conventional cache of the non-blocking type, the update of the address array is executed when the miss request is sent. Thus, this brings about a problem that the feature of the non-blocking type is not sufficiently used. For example, in the case of the above-mentioned example, at the time of the miss of the load instruction LDa, the entry corresponding to the INDEX1 of the address array 12 is updated at a considerably early timing when the miss request is sent. Hence, when a tag address prior to the update is referred to as TAG1, even if the following load instruction LDb has the index address INDEX1 and the tag address TAG1, this results in a miss hit.

As the related art, Japanese Laid Open Patent Application (JP-A-Showa, 63-234336) discloses "Information Processor". This information processor includes a cache memory. This information processor is provided with a boundary register, an address register, a boundary comparator and a cache control circuit. The boundary register which can be pre-set a boundary address of a main memory therein. The address register which holds an address to access the main memory and the cache memory. The boundary comparator which compares a content of the boundary register with a content of a part of the address register at a time of a request of an access to the main memory. The cache control circuit which controls whether or not the reference and the update of the cache memory is inhibited on the basis of the compared result by the boundary comparator.

Japanese Laid Open Patent Application (JP-A-Heisei, 7-219845) discloses "Cache Memory Control Method". In this cache memory control method, a store hit level register holds a first data array or a second data array hit at a time of a storing operation. A competition detection circuit detects a presence or absence of a cache access and a storing operation to different data arrays, on the basis of the contents of the store hit level register and a hit detection circuit. The control circuit instructs the respective data arrays to carry out the storing operation and a reading operation at the same time, if the storing operation is firstly done and the reading operation is then done with regard to the different data arrays, in accordance with the contents of the hit detection circuit, the store hit level register, the competition detection circuit and the operation register. Thus, the simultaneous operation to the different data arrays can be attained in the case of the cache access if the storing operation is firstly done and the reading operation is then done, or if the data is being loaded.

Also, Japanese Laid Open Patent Application (JP-A-Heisei, 8-55061) discloses "Cache Memory Controller". In this cache memory controller, when transfer start indication data "1" is set into a register, a detector judges whether or not a processor accesses a main memory and the like. If the processor does not access, a read address generated by a multiplexer is sent to the main memory. Thus, data is automatically transferred from the main memory to a freezing block (a group G1 of a data array). On the contrary, if transfer start indication data "0" is set into the register, the detector judges whether or not the processor accesses the main memory and the like. If the processor does not access, a write address generated by the multiplexer is sent to the main memory. Hence, the data is automatically transferred from the freezing block to the main memory. Accordingly, it is possible to provide the cache memory controller that can improve a throughput in an entire system.

Moreover, Japanese Laid Open Patent Application (JPA 2000-90007) discloses "Cache Control System, And Method of Reading The Same, And Record Medium For Recording Its Control Program". In this disclosed technique, an address controller calculates which block is accessed in advance in response to a memory access, and an address comparator of a cache body searches for a hit/miss through its block, and a request transmitter transmits a miss request in a case of the miss. Then, while the hit block is read out, the data of the miss request is returned back. Accordingly, the wait for a miss request process can be protected to thereby minimize the process stop caused by the miss. Thus, it is possible to provide the cache control method that can minimize the process stop caused by the cache miss.

SUMMARY OF THE INVENTION

The present invention is proposed in view of the above mentioned problems. Therefore, an object of the present invention is to provide a new cache update method and cache update control system that can sufficiently use a feature of a cache of a non-blocking type in which a process for a following instruction can be continued even while a request of reading out data caused by a cache miss is sent to a main memory.

In the cache update method and a cache update control system according to the present invention, in the cache of the non-blocking type, an address array and a data array are updated when responsive data is received from a main memory with regard to a request of reading out data caused by a cache miss.

In the present invention, if a cache miss occurs at a time of a load request from a processor core, the address array is updated in accordance with the fact that the responsive data is received from the main memory with regard to the request (miss request) of reading out the data caused by the cache miss. Thus, the update of the address array is delayed as compared with the conventional case. For example, let us suppose that a main memory access time until a reply of the responsive data after a transmission of the miss request is referred to as nT. The update of the address array is delayed by about nT times as compared with the conventional technique in which the address array is updated when the miss request is sent. Typically, because the nT is about 60 times a machine clock period, a considerable time is necessary. Hence, if a following instruction to hit an address belonging to an entry of an address array of an update schedule is issued by the processor core during the delayed time, this issuance leads to a cache hit. Thus, it is possible to sufficiently use the feature of the non-blocking type cache.

BRIEF DESCRIPTION OF THE DRAWINGS

FIG. 2 is a block diagram showing an example of a cache memory apparatus of a non-blocking type to which the present invention is applied;

DESCRIPTION OF THE PREFERRED EMBODIMENTS

Figure 1:
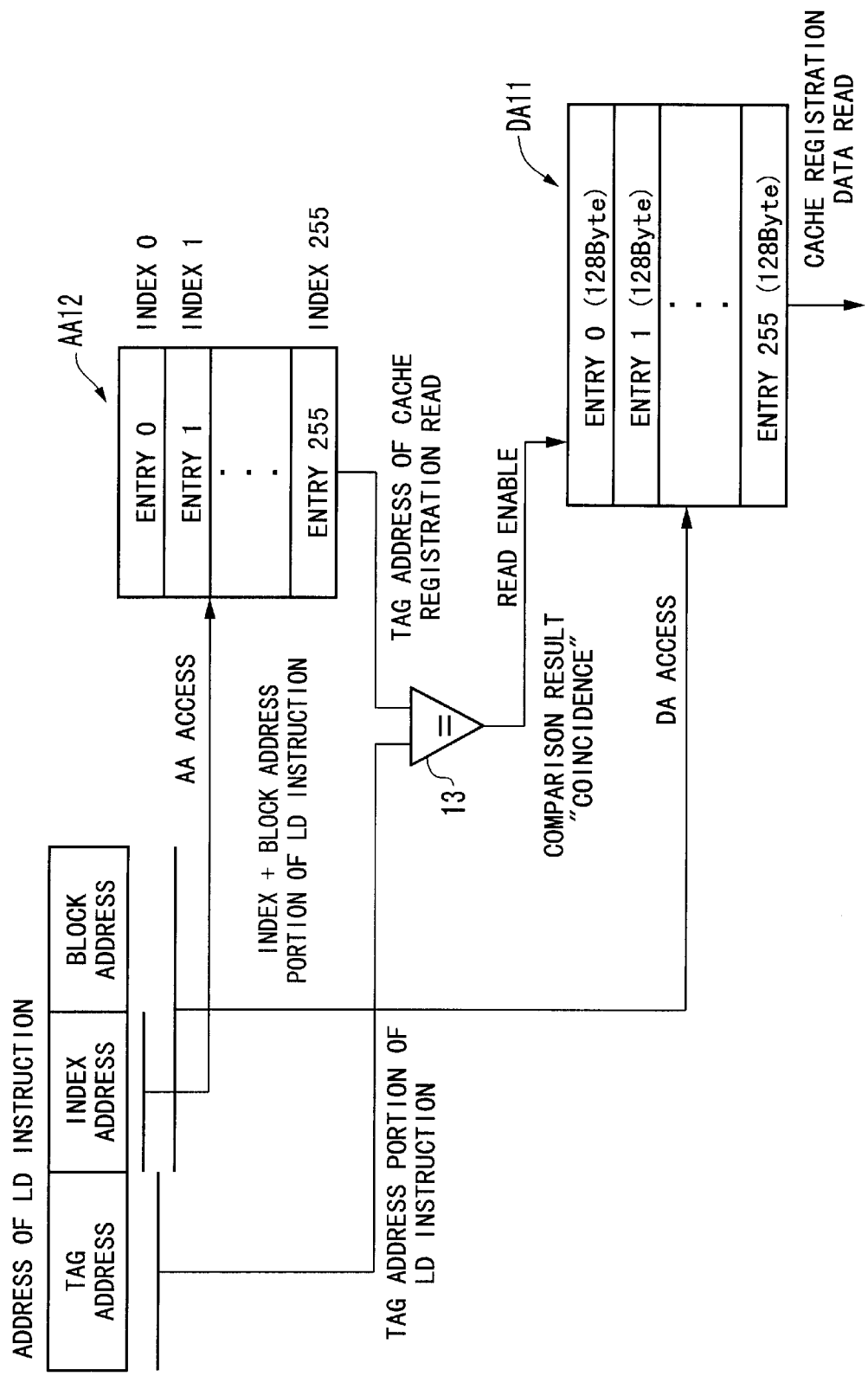
FIG. 1 is a block diagram schematically showing a conventional cache of a 1-WAY set associative type.

An embodiment of the present invention will be described below in detail with reference to the attached drawings.

Figure 2:
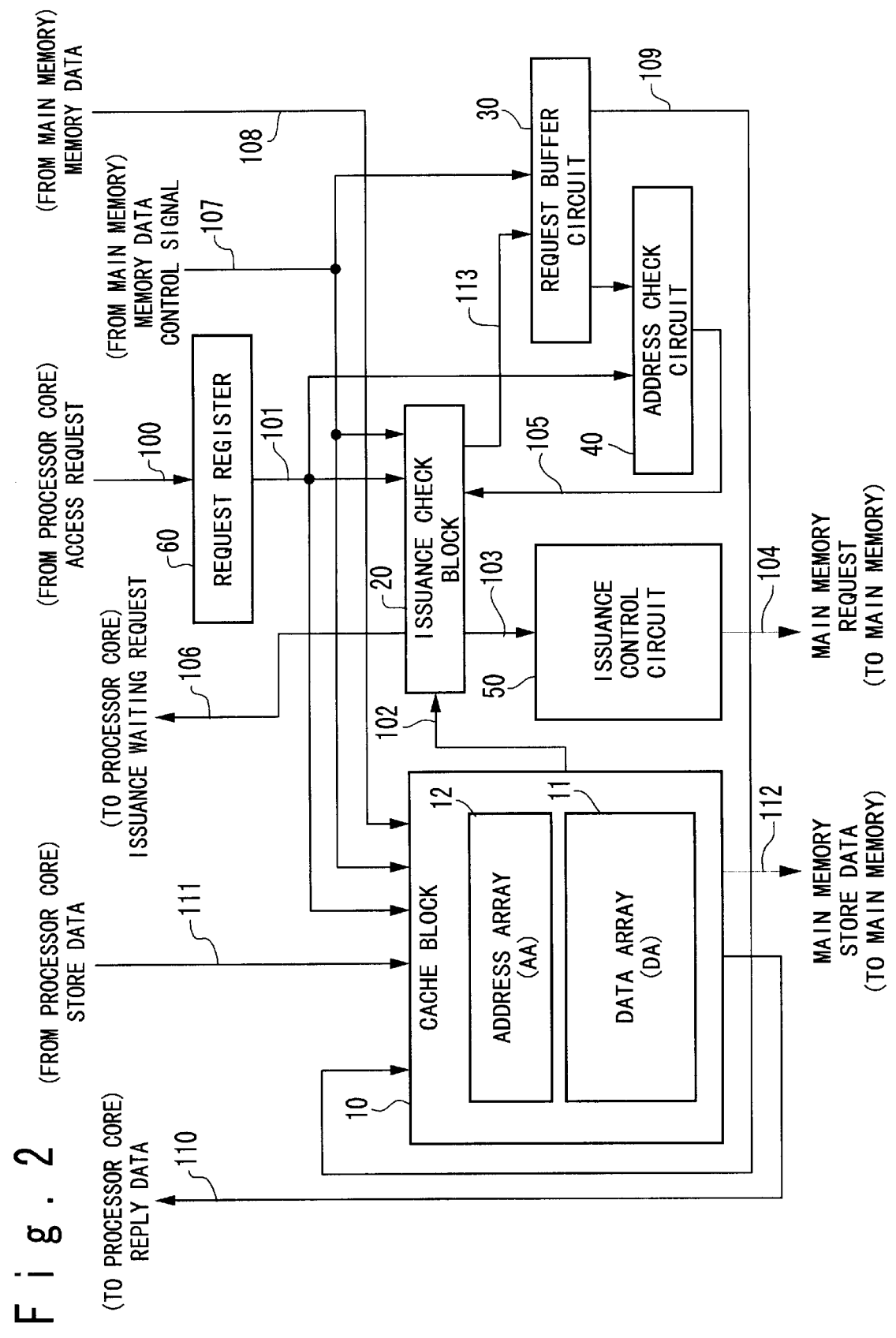

FIG. 2 a block diagram showing an example of a cache memory apparatus of a non-blocking type to which the present invention is applied. This cache memory apparatus is provided with a cache block 10, an issuance check block 20, a request buffer circuit 30, an address check circuit 40, an issuance control circuit 50 and a request register 60, as a main portion.

The cache block 10 is composed of a data array (DA) 11, an address array (AA) 12, a comparator (not shown) and the like. The data array (DA) 11 stores a copy of a part of main memory data at a block unit. The address array (AA) 12 stores an address of a data block stored in the data array 11. The comparator (not shown) judges a hit or miss. As the cache configuration, there are various configurations, such as 1-WAY, 2-WAY and 4-WAY set associative types and the like. The present invention can be applied to all the WAY configurations. In the following explanation, the 1-WAY configuration illustrated in FIG. 1 is described as a premise, and the change point when another WAY configuration is employed is suitably described.

The request register 60 holds an access request such as a load request and a store request from a processor core (not shown). The request buffer circuit 30 holds the information (address and the like) of a miss request (load request) issued to the main memory until main memory data required on the basis of the miss request is registered in the cache. Let us suppose that the maximum number of pieces of miss request information that can be held by the request buffer circuit 30 is N. In this case, the number of miss requests that can be sent at the same time (the number of miss requests in which data is not registered in the cache after issuance) is N. The maximum number of pieces of miss request information that can be held by the request buffer circuit 30 is not directly related to the present invention. The maximum number can be defined as any number equal to or greater than 1.

The address check circuit 40 compares an index address in an address of the miss request held by the request buffer circuit 30 with an index address in an address of a following load request. The issuance control circuit 50 is the existing circuit required when a processor issues a instruction to a portion outside the processor, and it controls issuance of a request resulting in the cache miss and the like. The issuance check block 20 carries out insurance of data read out to the cache and an issuance check of the request.

Figure 3:
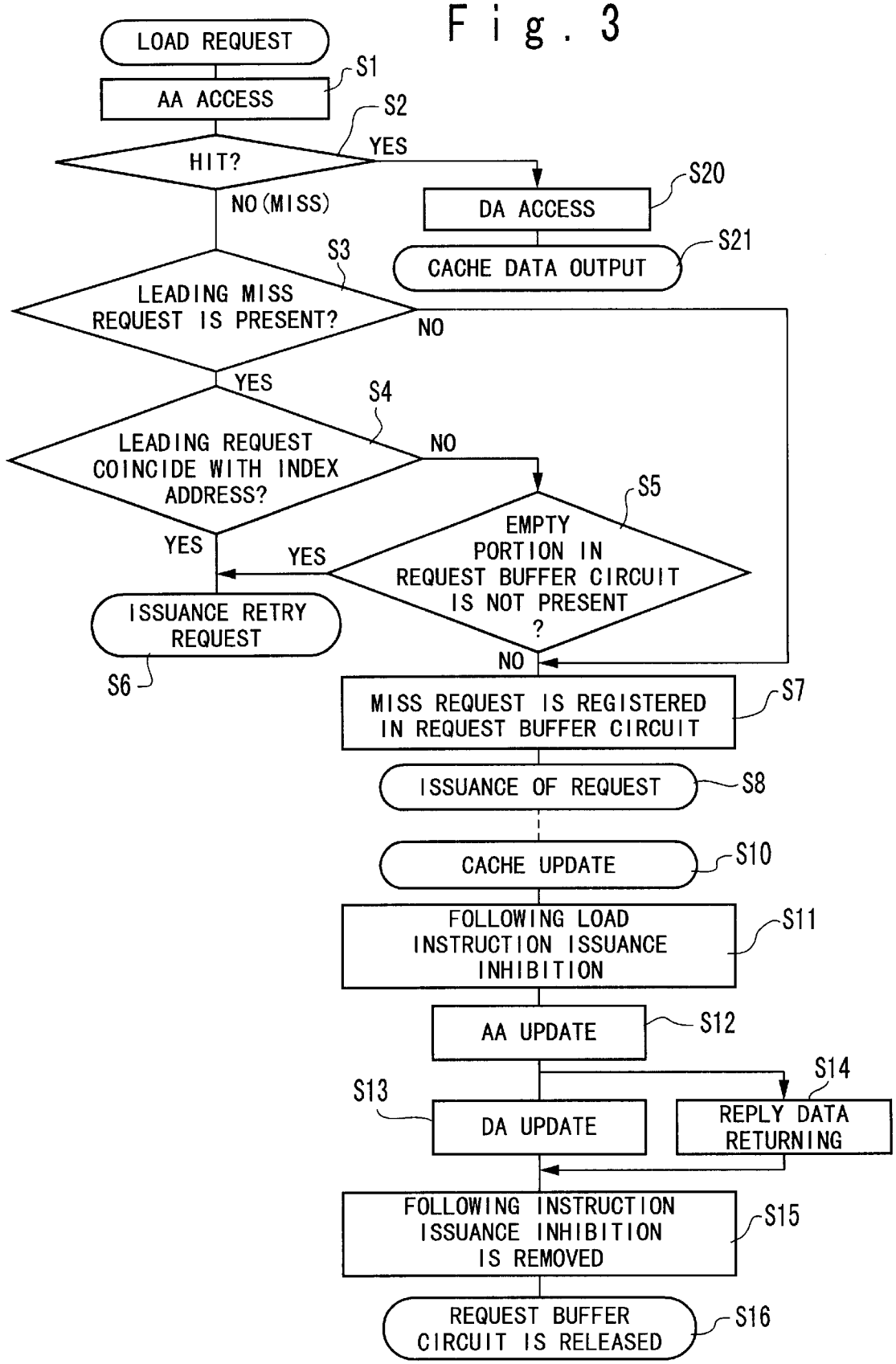
FIG. 3 is a flowchart schematically showing an operation of a cache at a time of a load request in the cache memory apparatus according to an embodiment of the present invention.

An operation of the cache when the load request is issued from the processor core will be described below with reference to FIGS. 2 to 8. It should be noted that FIG. 3 is a flowchart schematically showing the operation of the cache in a case of the load request. FIGS. 4 to 8 are the operational explanation views for respective scenes.

The load request from the processor core is stored in the request register 60 through a line 100. The load request includes a kind of a request, a main memory address and an identifier to uniquely identify the request (hereafter, referred to as a request ID). The main memory address is composed of the tag address, the index address and the block address, as illustrated in FIG. 1. The content of the load request stored in the request register 60 is sent through a line 101 to the cache block 10, the issuance check block 20 and the address check circuit 40.

In the cache block 10, the entry of the address array 12 is accessed by the index address in the main memory address of the load request (Step S1 of FIG. 3). Then, a judgment whether or not which is a cache hit is done in accordance with the comparison between a tag address stored in the entry and a tag address in the main memory address of the load request and the inspection of an effectiveness indication bit (Step S2). This judged result is also sent through the line 102 to the issuance check block 20.

In a case of a cache miss (NO at Step S2), the issuance check block 20 judges whether or not the information of the miss request is held by the request buffer circuit 30 (Step S3). If any one of the miss request information is not held (NO at Step S3), the miss request information (the main memory addresses of the load request at this time (the tag address, the index address and the block address) and the request ID and the like) is registered in an empty request buffer circuit 30 through a line 113. At the same time, the request is sent through a line 103 to the issuance control circuit 50. Thus, the load request of the block data specifying the main memory address specified by the load request held by the request register 60, namely, the miss request is sent to the main memory through a line 104 by the issuance control circuit 50 (Steps S7 and S8). In this embodiment of the present invention, at the time of the sending of a miss request, the address array 12 of the cache block 10 is not updated.

Figure 4:
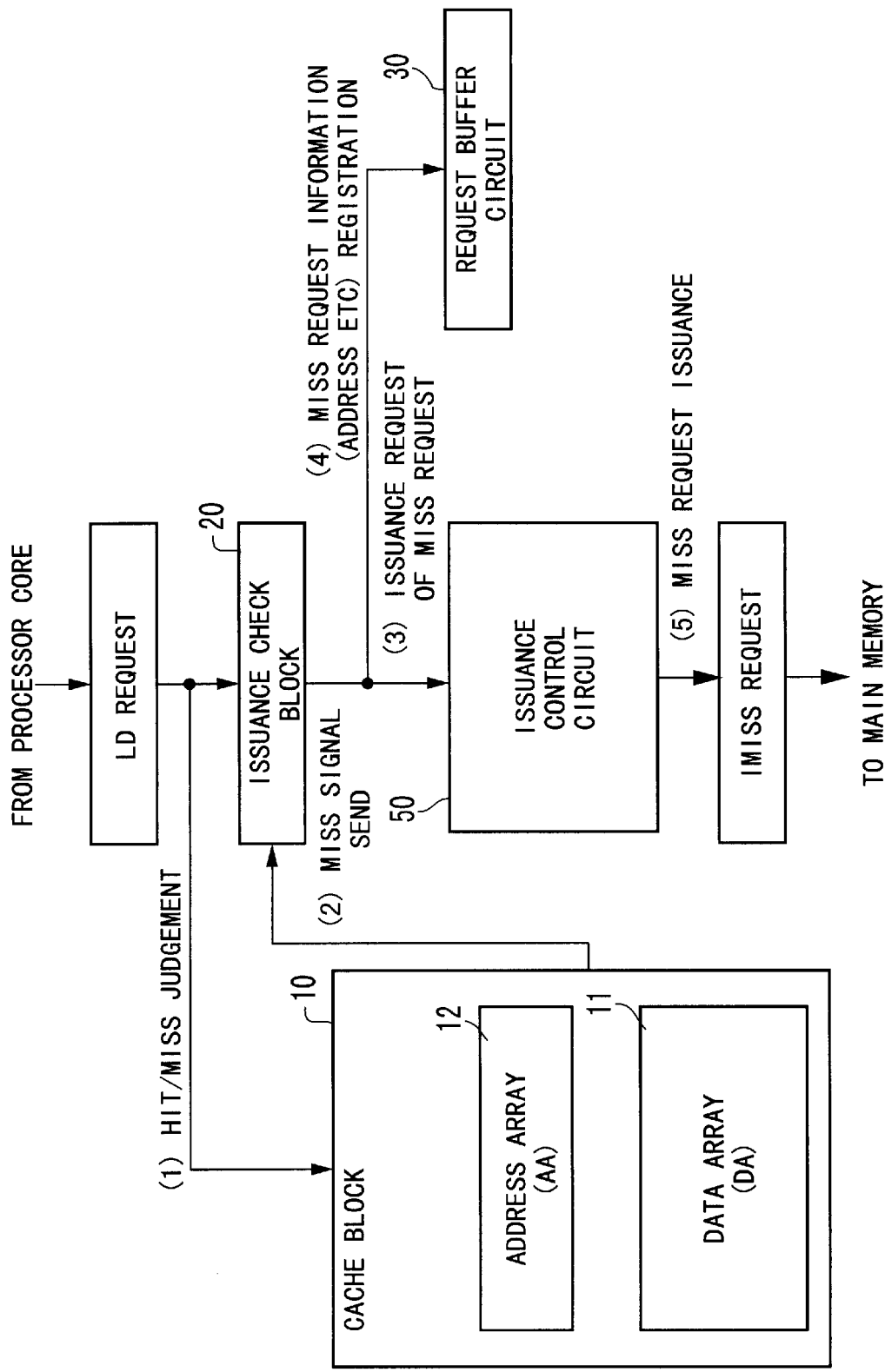
FIG. 4 is an operational explanation view when a miss request is sent to a main memory at a time of a cache miss in the cache memory apparatus according to the embodiment of the present invention.

FIG. 4 is the operational explanation view in this scene. The judgment of the hit/miss is done by accessing the address array 12 within the cache block 10, on the basis of the main memory address of the load request ((1)). Since the judgement result shows the miss, a miss signal is sent to the issuance check block 20 ((2)). The issuance check block 20 issues an issuance request of a miss request to the issuance control circuit 50 ((3)). At the same time, the information of the issued miss request is registered in the request buffer circuit 30 ((4)). Also, the issuance control circuit 50 sends the miss request to the main memory ((5)).

On the other hand, if the information of the miss request is held by the request buffer circuit 30 (YES at Step S3), the address check circuit 40 investigates whether or not an index address in the information of the miss request held by the request buffer circuit 30 coincides with an index address in the request register 60 (Step S4). If the index address in the information of the miss request (leading miss request) held by the request buffer circuit 30 does not coincide with the index address in the request register 60 (NO at Step S4), and if there is an empty portion in the request buffer circuit 30 (NO at Step S5), the operational flow proceeds to a step S7. In short, the information of the miss request is registered in the request buffer circuit 30. At the same time, the issuance control circuit 50 sends the miss request to the main memory (Steps S7 and S8).

Figure 5:
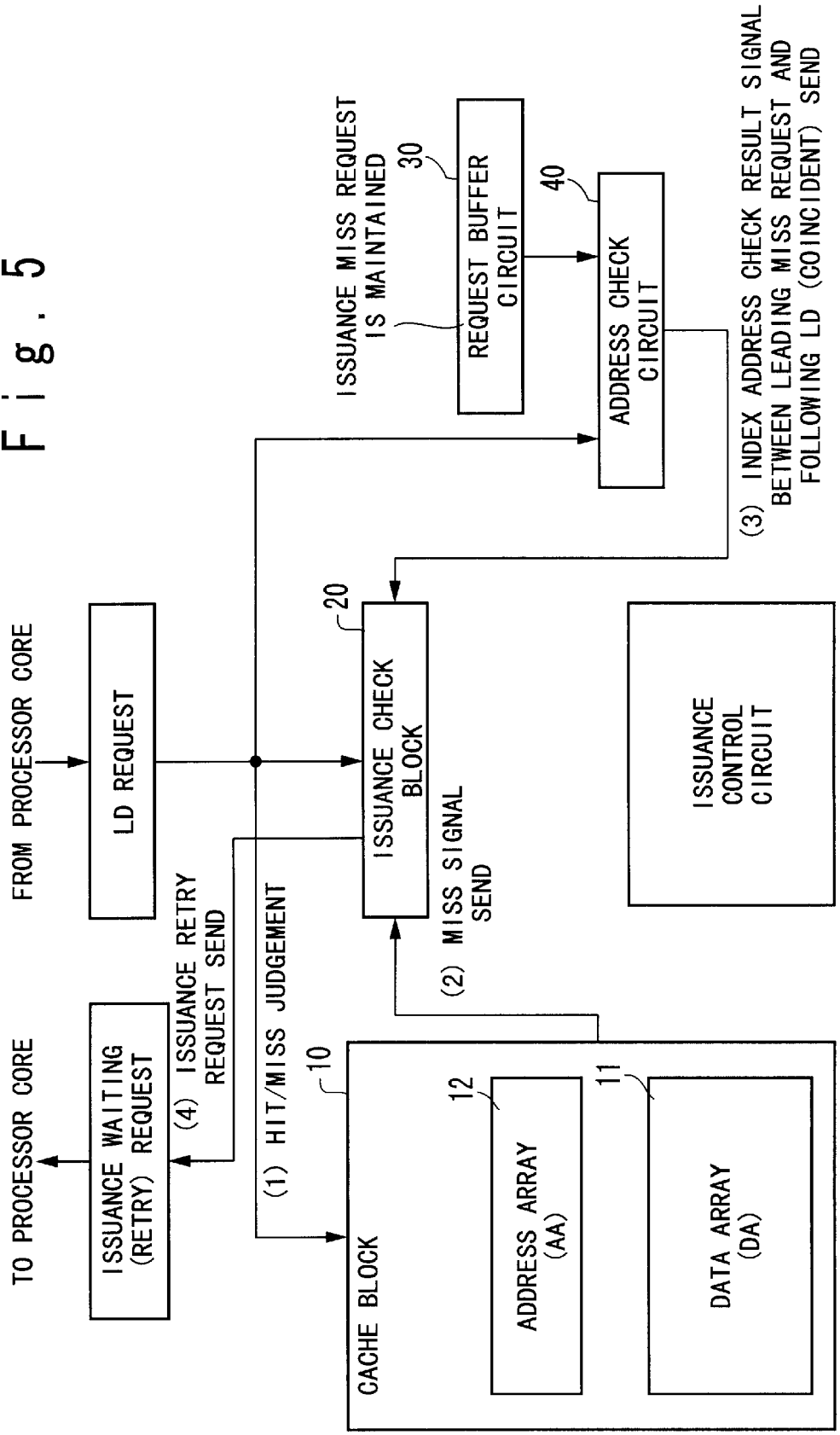
FIG. 5 is an operational explanation view when an issuance retry request is sent to a processor core at the time of the cache miss in the cache memory apparatus according to the embodiment of the present invention.

However, if the index address in the information of the miss request (leading miss request) held by the request buffer circuit 30 coincides with the index address in the request register 60 (YES at Step S4), an issuance retry request is sent through a line 106 to the processor core (Step S6). With this operation, it is instructed to again issue the load request after the cache registration of the data of the leading load request (leading miss request). FIG. 5 is an operational explanation view in this scene. The judgment of the hit/miss is done by accessing the address array 12 within the cache block 10, on the basis of the address of the load request ((1)). Since the judgement result shows the miss, the miss signal is sent to the issuance check block 20 ((2)). Also, the address check circuit 40 sends the fact that the index addresses of the leading miss request coincides with the index address of the following load request, through a line 105 to the issuance check block 20 ((3)). For this reason, the issuance check block 20 sends the issuance retry request to the processor core ((4)).

The reason why the issuance retry request is issued if the following load request is the miss hit and it has the same index address as the leading load request is the result of the consideration of the following points since this embodiment employs the cache having the 1-WAY set associative configuration.

(a) The fact that the leading load request and the following load request cause the misses in the same index address implies that the same entry on the cache is written. If it is designed to also send the miss request to the main memory with regard to the following request, and if the timings of the returns in the data of the leading request and the following request are equal to each other, the data of the different addresses are simultaneously returned back to the entry. Thus, the circuit to arrange them is very complex.

(b) In the case of the same index address, if the tag addresses are equal to each other, the same cache line (block) is selected. In this case, if the data is fetched from the main memory on the basis of the leading request, the following request can fetch the data from the cache by waiting for the registration of the data in the cache. It is not especially necessary to send the request to the main memory. Thus, this is effective.

However, in the case of the cache having the set associative configuration of 2-WAY or more, only when the following load request is at the miss state, and the leading load request, the index address and the tag address are same, the issuance retry request is sent to the processor core. In the case of the coincidence between only the index address, the following load request in its original state is registered in the empty portion of the request buffer circuit 30, and the miss request is sent to the main memory. The reason why the issuance retry request is sent when the index address and the tag address are same is equal to the reason (B) why the issuance retry is sent in the 1-WAY configuration. Also, the reason why in the case of the coincidence between only the index addresses, namely, in the case of the difference between the tag addresses, the miss request is sent is that in the case of the n-WAY (n>2) configuration, there are n entries for one index address. Thus, if the index address of the following request is same as that of the leading request, the following request may be registered in the entry different from that of the leading request. However, if the n+1 or more miss requests are sent to the same index address, this results in the condition that the data of two or more different addresses are registered in the same entry. In this case, because the control becomes very difficult, the issuance try is sent in this case.

Figure 6:
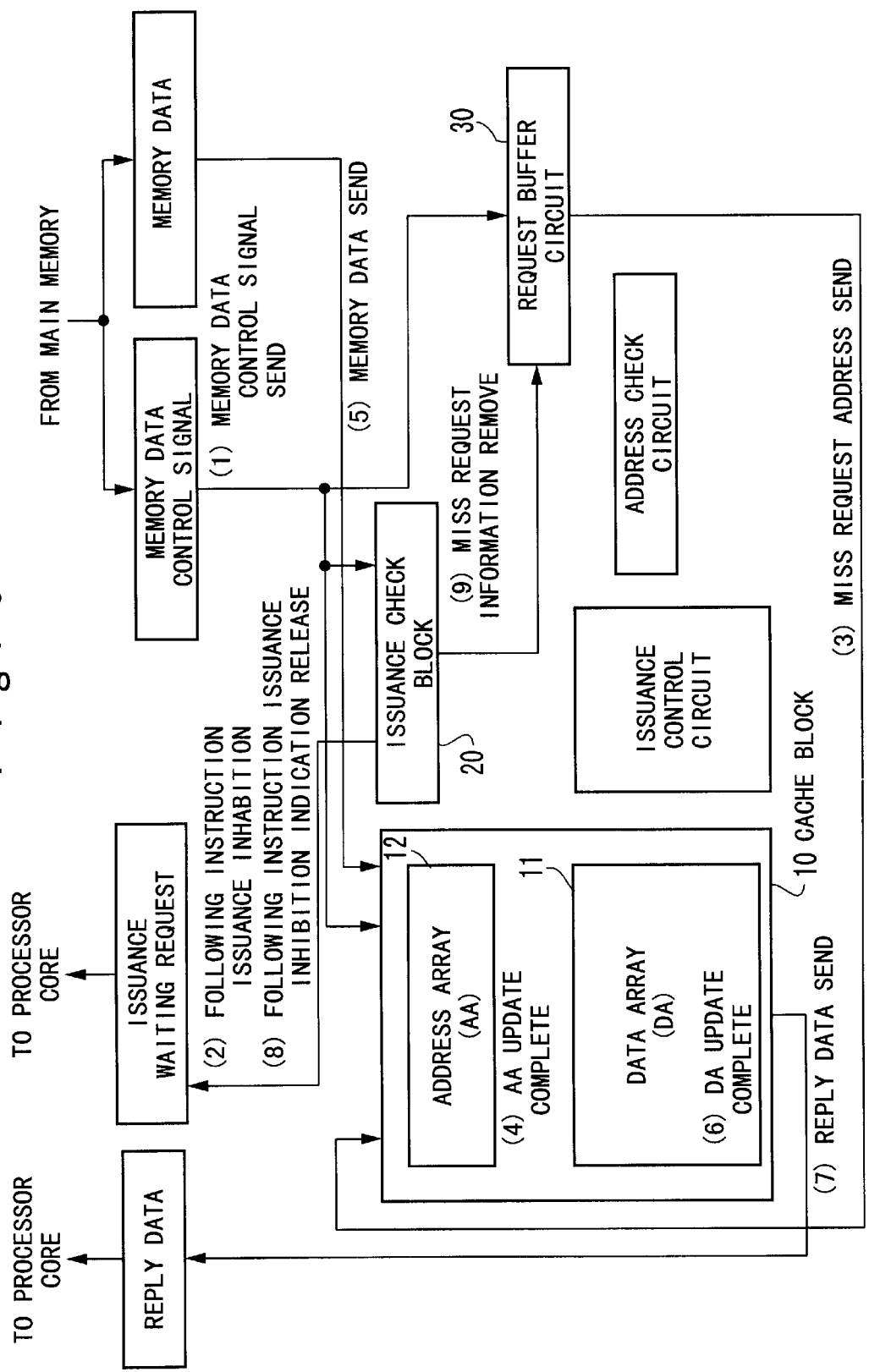
FIG. 6 is an operational explanation view when responsive data corresponding to the miss request is received from the main memory in the cache memory apparatus according to the embodiment of the present invention.
Figure 7:
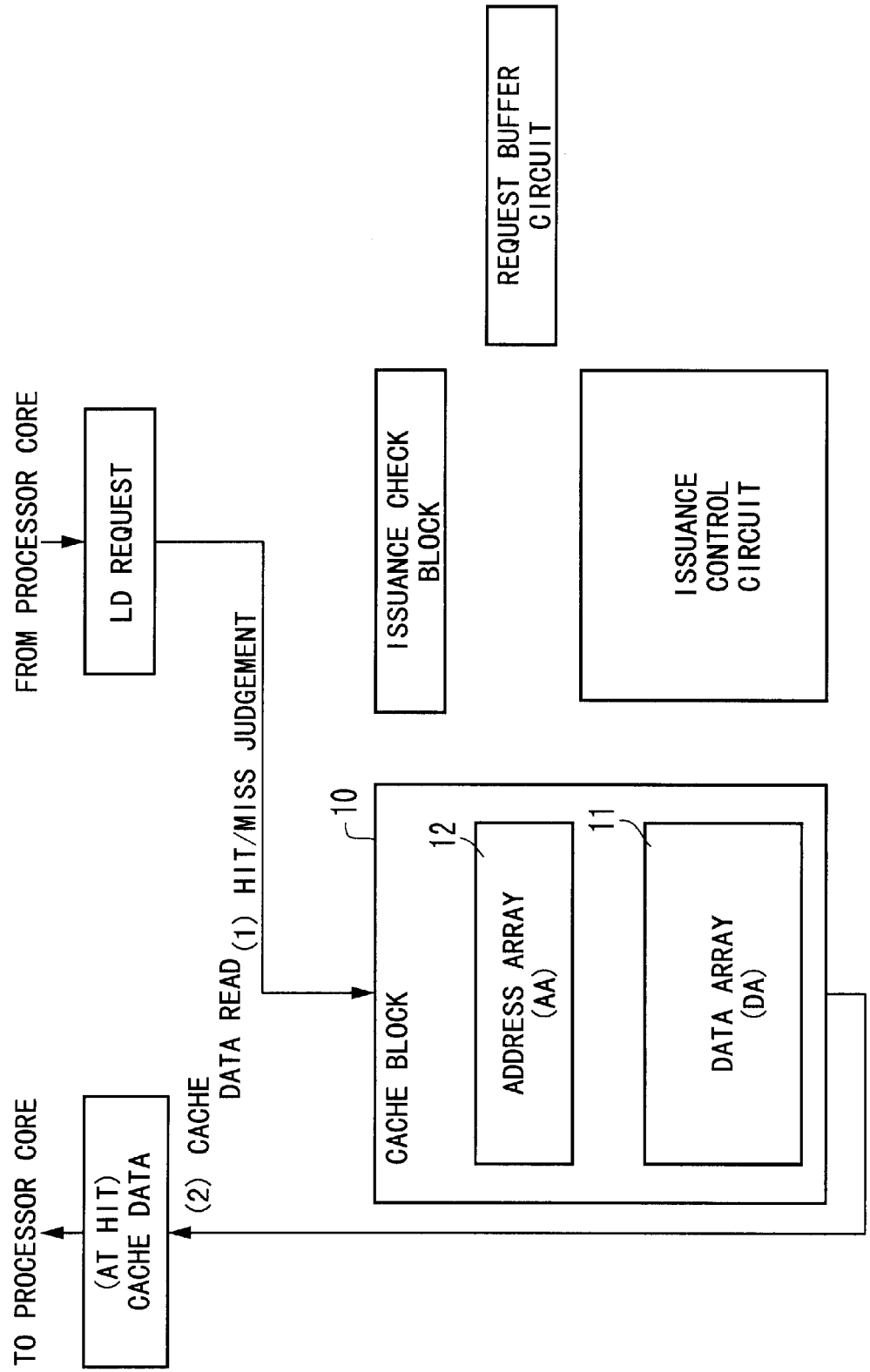
FIG. 7 is an operational explanation view at a time of a cache hit in the cache memory apparatus according to the embodiment of the present invention.

By the way, when the data is returned from the main memory in response to the miss request sent to the main memory, the cache update process is started (Step S10). FIG. 6 is an operational explanation view in this scene.

At first, when a memory data control signal to indicate an write address on the cache and the like is sent through a line 107 from the main memory, the memory data control signal is sent to the cache block 10, the issuance check block 20 and the request buffer circuit 30 ((1)). The issuance check block 20, in response to the received memory data control signal, sends a following instruction issuance inhibition indication through the line 106 in order to inhibit the usage of the cache to the processor core (Step S11) ((2)). Also, the request buffer circuit 30, in response to the received memory data control signal, sends the miss request information having the same tag address and index address as the tag address and the index address in the address of the memory data control signal, through a line 109 to the cache block 10 ((3)). The cache block 10, in response to the received memory data control signal, recognizes the start of the data writing operation. Then, at the timing after the following instruction issuance inhibition indication is sent from the issuance check block 20, the tag address in the miss request information being outputted to the line 109 from the request buffer circuit 30 is written into the entry of the address array 12 indicated by the index address similarly outputted to the line 109 from the request buffer circuit 30, and accordingly the address array 12 is updated (Sep S12) ((4)). As mentioned above, in the embodiment of the present invention, the address array 12 is updated in accordance with the reception of the responsive data corresponding to the miss request.

On the other hand, the main memory data inputted on (at the same timing) or after the memory data control signal is inputted through a line 108 to the cache block 10 ((5)). In the cache block 10, this inputted main memory data is written to the entry of the data array 11 indicated by the index address in the miss request information being outputted to the line 109, and accordingly, the data array 11 is updated (Step S13) ((6)). At the same time, in the cache block 10, the address within the block of the main memory data to be written to the data array 11 is always checked to then pick up the data (8 bytes) at the time of the reception of the data having the same address as the block address in the miss request information sent from the request buffer circuit 30 through the line 109 and return to the processor core as reply data through a line 110 (Step S14) ((7)). The replay data is associated with the request ID in the miss request information so that the load request to which the reply data corresponds can be determined by the processor core. Then, if such a cache update operation is completed, in the issuance check block 20, the following instruction issuance inhibition indication signal being sent through the line 106 to the processor core is released (Step S15) ((8)). Finally, in the issuance check block 20, the information of the miss request processed at this time is removed from the request buffer circuit 30 (Step S16) ((9)). Then, the operations with regard to the miss request are completed.

The operation in the case of the cache hit of the load request issued from the processor core will be described below. As shown in the operational explanation view of FIG. 7, the judgement on the hit/miss is executed ((1)). In the case of the cache hit (YES at Step S2), the hit cache data is read out from the data array 11 (Step S20), and the read cache data is returned back to the processor core as the reply data through the line 110 (Step S21) ((2)).

Figure 8:
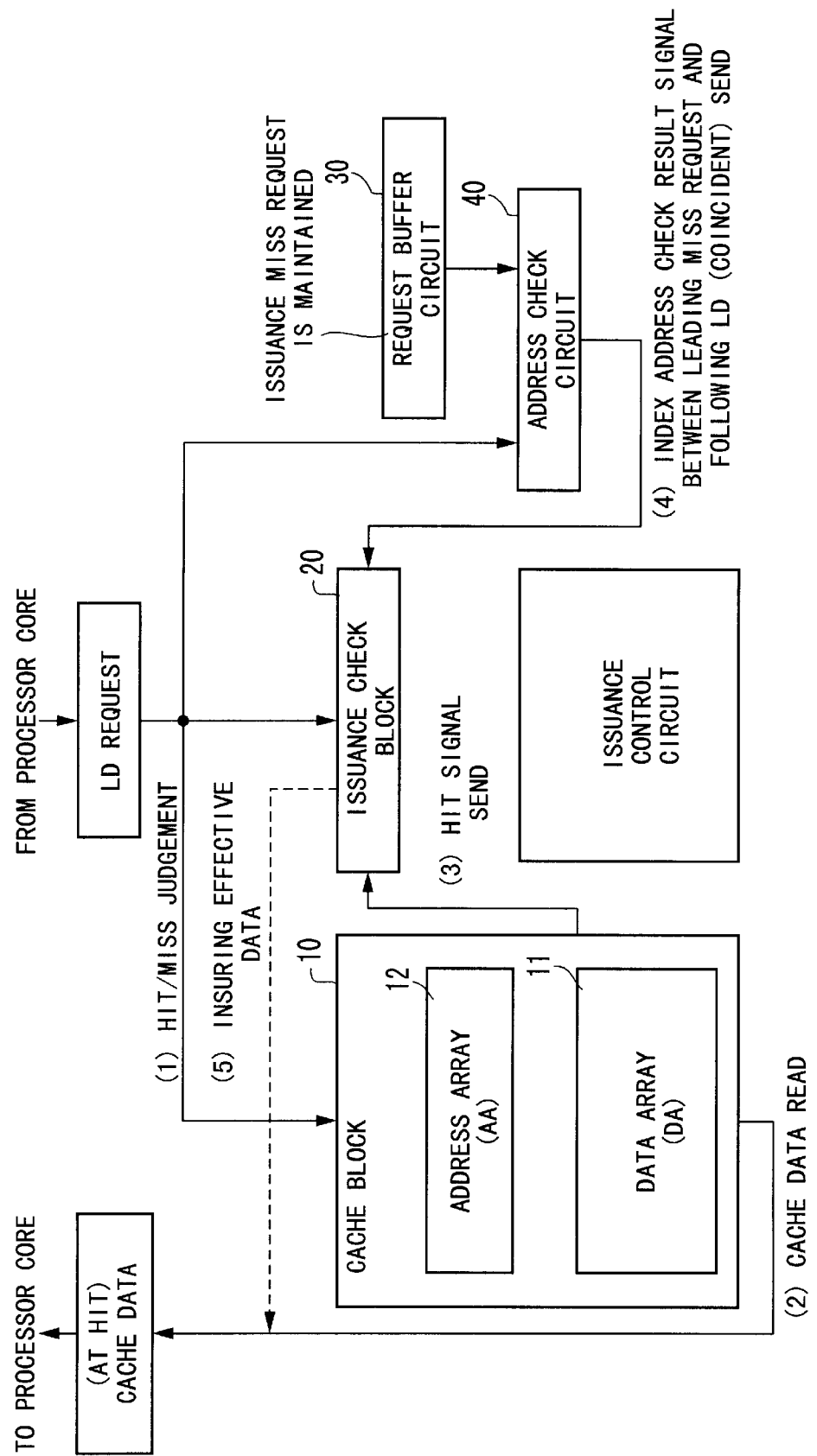
FIG. 8 is an operational explanation view at a time of a cache hit in the cache memory apparatus according to the embodiment of the present invention.

Moreover at this time, if the leading miss request exists and the index address coincidence with the miss request occurs, as shown in the operational explanation view of FIG. 8, a hit signal is sent to the issuance check block 20 from the cache block 10 ((3)). Thus, in the issuance check block 20, the issuance retry request is not sent to the processor core, even if the coincidence between the index address of the load request at this time and the index address of the leading miss request registered in the request buffer circuit 30 is detected by the address check circuit 40 ((4)). So, this insures that it is the effective data ((5)). In short, since the issuance retry request is not sent, the processor core recognizes that the data returned through the line 110 is effective, and uses the data.

Figure 9:
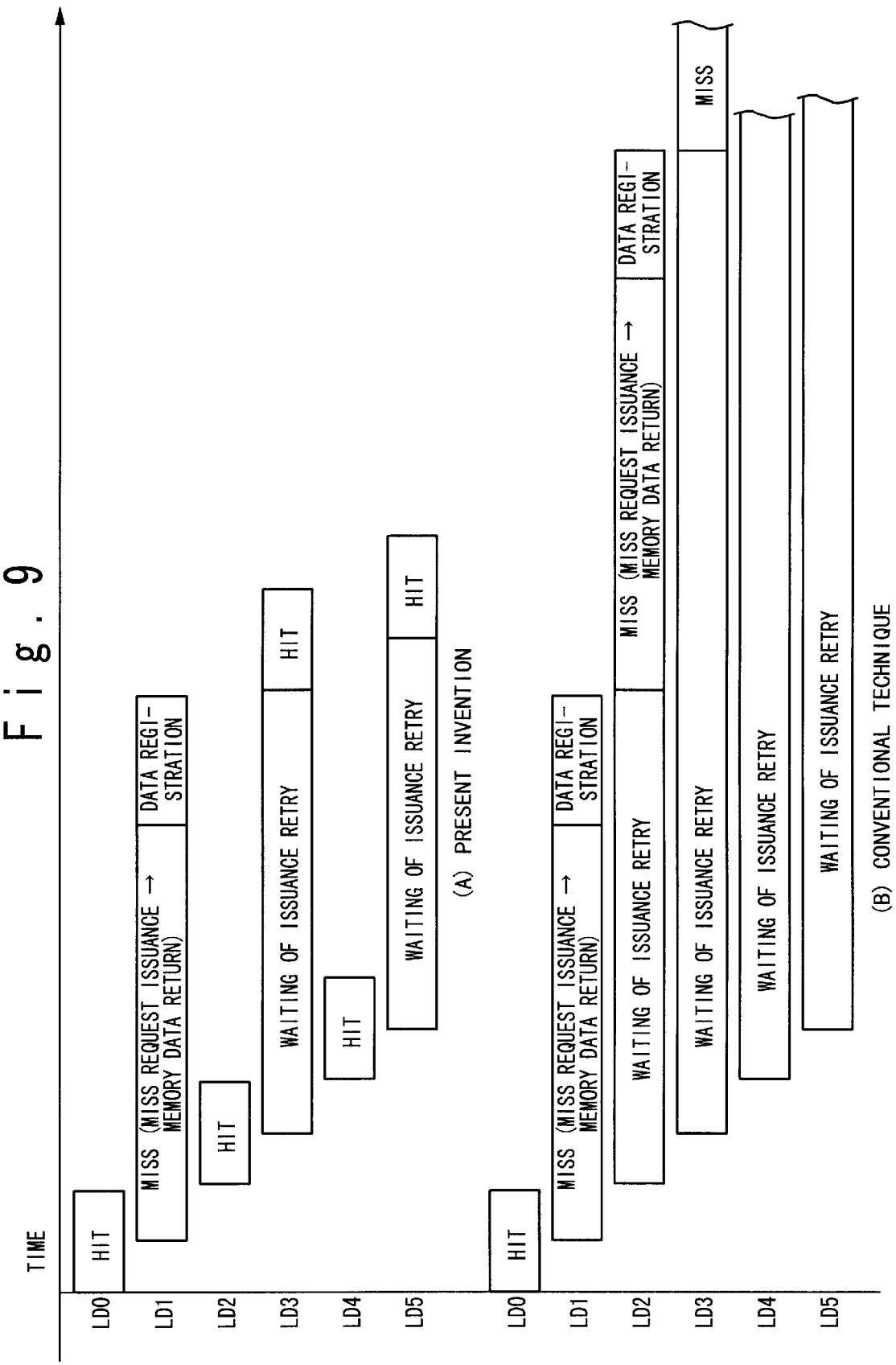
FIG. 9 is a timing chart showing a difference between processing speeds of the cache memory apparatuses of the conventional technique and the embodiment according to the present invention.

As mentioned above, according to the cache memory apparatus of this embodiment, the update of the address array is not started when the miss request is issued, and the update timing of the address array is intentionally delayed by starting it when the responsive data is received from the main memory with regard to the miss request. Thus, old cache data held in an entry of an update schedule can be used as long as possible, which enables the effective usage of the cache. As an example, FIG. 9 shows the difference of the processing speed between the cache memory apparatus according to the conventional technique and the cache memory according to this embodiment. This example describes the operation when the requests in which although the index addresses are same, the cache lines are different are alternately occurred. That is, load requests LD0, LD2 and LD4 access to the same block (a cache line A) having the same tag address and index address. Load requests LD1, LD3 and LD5 access to the same block (a cache line B) having the same tag address and index address. The cache line A and the cache line B have the same index. However, they are the cache lines different from each other. In short, the load requests LD0, LD2 and LD4 and the load requests LD1, LD3 and LD5 have the same index addresses and the different tag addresses. Also, it is assumed that the cache data corresponding to the cache line A is firstly registered.

As can be evident from FIG. 9, in the conventional technique (B), after the hit of the load request LD0, the following load requests LD1 of the same index address are on the different cache line, which brings about the miss, and they are issued as the miss request. The next load request LD2 is on the same cache line as the load request LD0. However, the address array is already updated by the load request LD1. Thus, it is at a wait state for an issuance retry (because of the 1-WAY configuration, the request of the same index address can not be issued). After that, the data of the load request LD1 is registered in the cache, and the retry request is released. So, even if the load request LD2 is issued, it becomes the miss request since the load request LD1 is already registered. Moreover, it takes a time to request the data to the main memory and capture it. If the same index address is continuous in this way, the miss and the retry are increased, which results in the sharp drop in the usage efficiency of the cache.

On the other hand, in the cache memory apparatus according to the embodiment of the present invention (A), the load request LD1 brings the miss hit similarly to the conventional technique. However, with regard to the load request LD2, because the same cache data as the load request LD0 can be still used, it brings the hit. The next load request LD3 becomes at the wait state for the issuance retry since the load request LD1 is already issued. The next load request LD4 hits the cache data before the update, similarly to the load request LD2, and it captures the data. The load request LD5 becomes at the wait state for the issuance retry similarly to the load request LD3. When the data of the load request LD2 is registered, it is possible to access the cache and then capture the data by the hit. Consequently, in the case of this embodiment, if the requests in which the index addresses are same and the cache lines are different are alternatively continuous, it is possible to considerably improve the performance.

Figure 10:
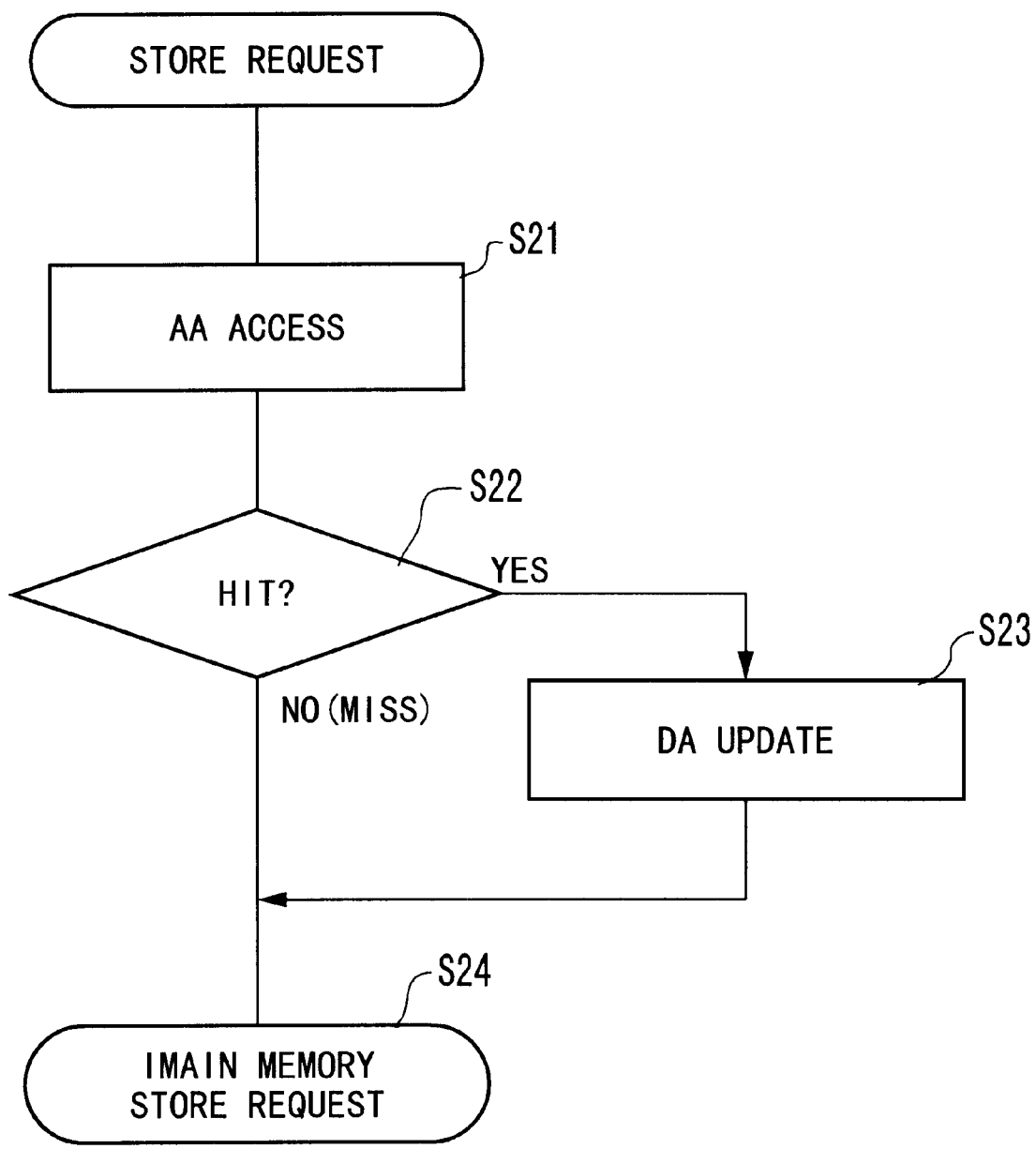
FIG. 10 is a flowchart schematically showing a cache operation at a time of a store request in the cache memory apparatus according to the embodiment of the present invention.

The cache operation with regard to the store request in this embodiment of the present invention will be described below. The cache memory apparatus of this embodiment employs a write-through method in which all of the writing operations to the cache is done even for a corresponding address on the main memory for each operation. FIG. 10 schematically shows the process.

When the store request from the processor core is held in the request register 60, the content of the request register 60 (a store address and the like) is sent through the line 101 to the cache block 10 and the issuance check block 20, and the entry of the address array 12 is accessed in accordance with the index address in the main memory address of the store request (Step S21). Then, a judgment on a cache hit is done in accordance with the comparison between a tag address stored in the entry and a tag address in the main memory address of the store request and the inspection of an effectiveness indication bit (Step S22). As the judged result, in the case of the hit, a byte position indicated by the store address in the hit entry of the data array 11 is updated on the basis of the store data inputted from the processor core through a line 111 (Step S23). Irrespectively of the hit or miss, the cache block 10 sent the store data from the processor core through a line 112 to the main memory. The issuance check block 20 sent the store request from the issuance control circuit 50 to the main memory (Step S24).

In the cache memory apparatus according to this embodiment, as mentioned above, the update of the address array is delayed as compared with the conventional technique so that the cache data in the entry of the update schedule caused by the miss request can be used as long as possible. Thus, the hit rate in the case of the store request is also improved similarly to the case of the load request. In short, the store request to the cache data in the entry of the update schedule caused by the miss request is hit and updated on the cache. For this reason, it is hit when the load request to the cache data in the entry is issued immediately after that. Thereby, the hit rate can be further improved.

Next, a concrete instance in the main portion at the cache memory apparatus of this embodiment will be explained.

Figure 11:
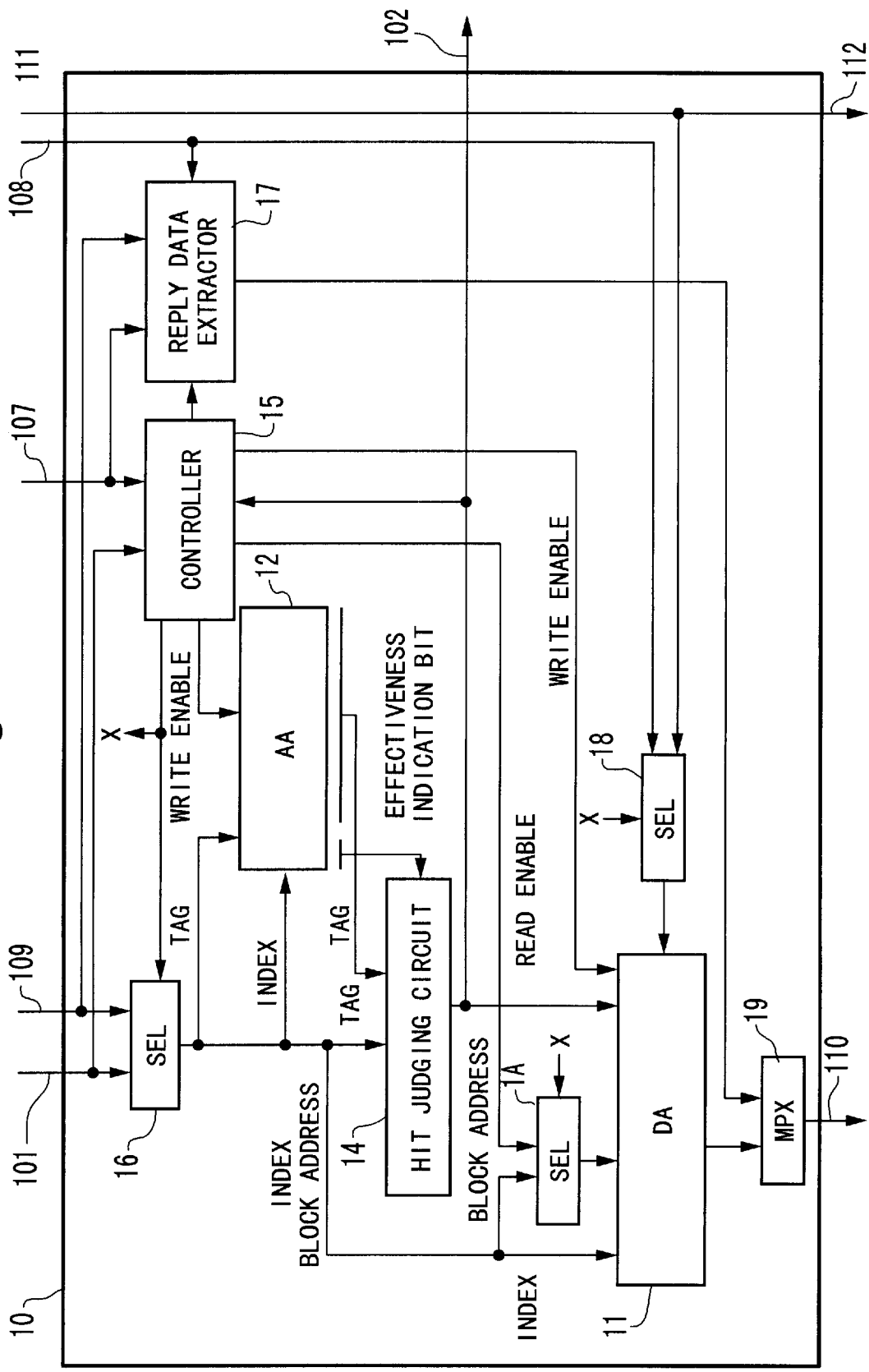
FIG. 11 is a block diagram showing a configuration example of a cache block in the cache memory apparatus according to the embodiment of the present invention.

FIG. 11 is a block diagram showing a configuration example of the cache block 10. A controller 15 is a portion for carrying out a main control of the cache block 10. Usually, the controller 15 switches a selector 16 to the side of the line 101 connected to the request register 60, switches a selector 18 to the side of the line 111 for sending the store data, and switches a selector 1A to the side for selecting a block address in an address outputted from the selector 16. When the content of the request register 60 is received through the line 101, the controller 15 determines a kind of a request, and divides the control depending on the kind of the load request and the store request.

In a case of the load request, the entry of the address array 12 is accessed in accordance with an index address in a main memory address indicated by the load request, and a hit judging circuit 14 compares a tag address stored in the entry with a tag address in the load request, and then inspects an effectiveness indication bit. The hit judging circuit 14 outputs a hit signal in a case of the hit, and outputs a miss signal in a case of the miss. The hit/miss signal is sent through the line 102 to the issuance check block 20, and simultaneously sent to the data array 11 and the controller 15 within the cache block 10. In a case of a cache hit, the hit signal added to the data array 11 from the hit judging circuit 14 becomes a read enable signal. Thus, in the entry of the data array 11 specified by the index address of the load request, 8-byte data specified by a block address of the load request is read out from the data array 11, and the read data is sent while associated with an request ID in the store request, to the processor core through the line 110 via a multiplexer 19. On the other hand, in a case of a cache miss, the read enable signal does not become effective. Thus, the cache data is not read out.

On the other hand, in a case of the store request, the hit judging circuit 14 carries out the judgement on the hit or miss, similarly to the case of the load request. In a case of the hit, the controller 15 outputs a write enable signal to the data array 11. Accordingly, store data sent from the processor core through the selector 18 and the line 111 is written to the byte position of the entry in the data array 11 specified by the block address and the index address of the store request. On the other hand, in a case of the cache miss, the write enable signal does not become effective. Thus, the store data is not written to the data array 11. Irrespectively of the cache hit or miss, the store data on the line 111 is sent through the line 112 to the main memory.

When receiving a memory data control signal from the main memory as responsive data with regard to a miss request through the line 107, the controller 15, until the completion of the process with regard to the miss request, switches the selector 16 to the side of the line 109 connected to the request buffer circuit 30, and switches the selector 18 to the side of the line 108 to receive memory data from the main memory, and switches the selector 1A to the side to select a block address outputted by itself. Also, the controller 15 actuates a reply data extractor 17. Then, the controller 15 sends the write enable signal to the address array 12, and accordingly writes the tag address selected by the selector 16 (the tag address in the address with regard to the miss request sent through the line 109 from the request buffer circuit 30) to the entry specified by the same index, and then updates the address array 12. If an effectiveness indication bit is already effective, it is kept at its original state. If the effectiveness indication bit is not effective, it is made effective. Actually, the judgment of effectiveness and ineffectiveness is omitted, and an operation for making it effective is always done when an index address is written to the address array 12.

Also, the controller 15 sequentially adds the block address appearing on the line 107 to the data array 11 through the selector 1A, and makes the write enable signal of the data array 11 effective, and then writes block data sent from the main memory through the selector 18 and the line 108 to a byte position of an entry of the data array 11 specified by an index address sent through the selector 16 and the line 109 from the request buffer circuit 30 and a block address sequentially outputted by itself, and accordingly updates the data array 11. Moreover, the reply data extractor 17 monitors the block address appearing on the line 107, and extracts target data (data of a cache miss) on the line 108, when the same address as the block address in the address with regard to a miss request sent from the request buffer circuit 30 through the line 101 appears on the line 107, and then sends the extracted data associated with the request ID, to the processor core through the line 110 and the multiplexer 19.

It should be noted that, on the cache having the set associative configuration of 2-WAY or more, there are two or more entries with regard to one index address. Thus, an entry to be updated is determined by an LRU method, an FIFO method or the like. This determination of the update entry may be done at a time of a reception of responsive data with regard to the miss request, or may be transiently suspended until an update timing of an address array to be carried out at the time of the reception of the responsive data after only the process for determining the update entry is done at a time of issuance of the miss request.

Figure 12:
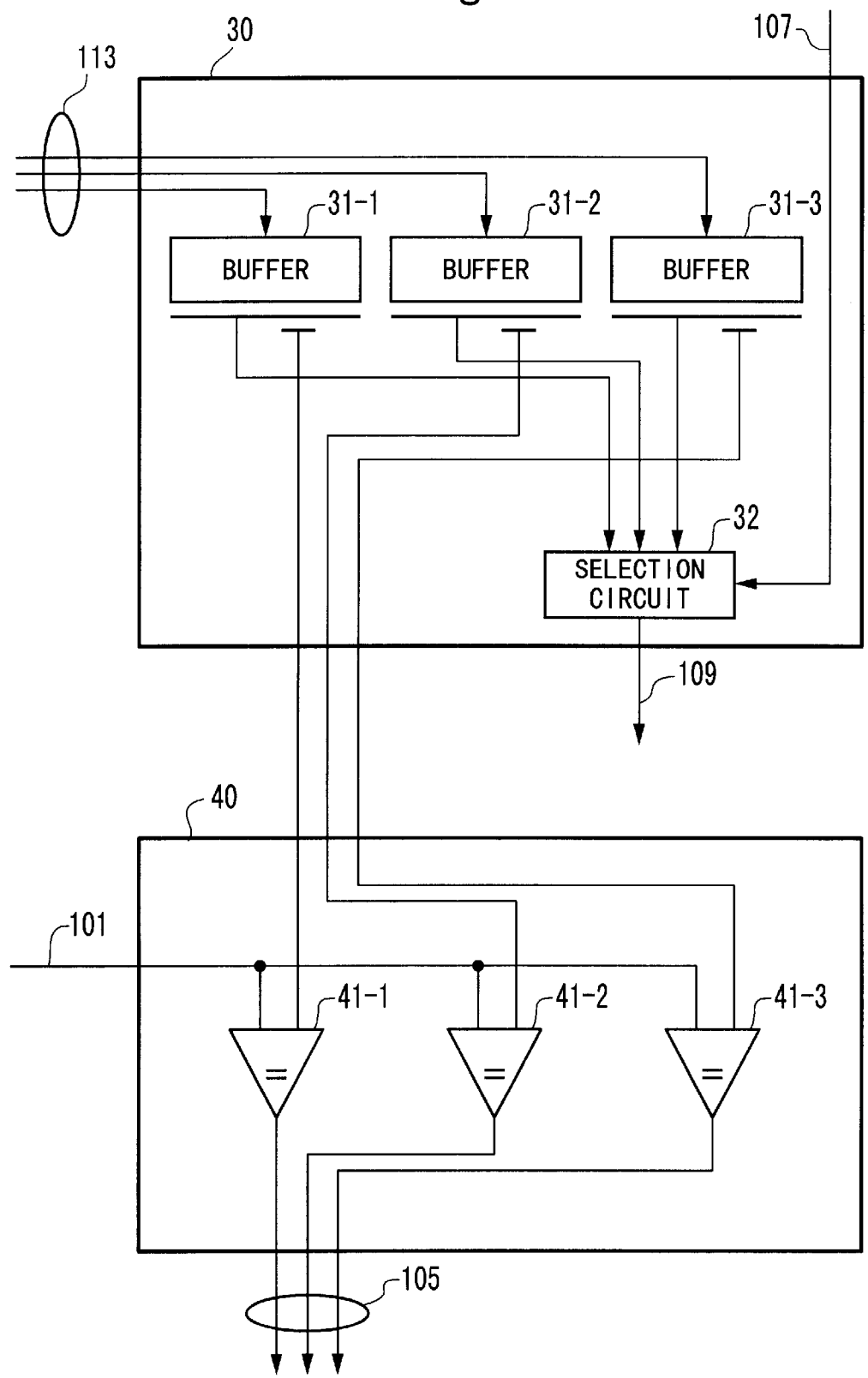
FIG. 12 is a block diagram showing a configuration example of a request buffer circuit and an address check circuit in the cache memory apparatus according to the embodiment of the present invention.

FIG. 12 is a block diagram showing a configuration example of the request buffer circuit 30 and the address check circuit 40, and shows an example of a case when the maximum number of miss requests that can be sent at the same time is 3. Each of three buffers 31-1 to 31-3 mounted in the request buffer circuit 30 keeps the information corresponding to each one miss request sent from the issuance check block 20 through the line 113. The content of each of the buffers 31-1 to 31-3 is outputted to a selection circuit 32, and the portion of an index address is further outputted to the address check circuit 40. The selection circuit 32 receives a tag address and an index address in a memory data control signal supplied through the line 107, and selects the outputs of the buffers 31-1 to 31-3 held the same tag address and index address to output through the line 109 to the cache block 10.

The address check circuit 40 is constituted by comparators 41-1 to 41-3 corresponding to the respective buffers 31-1 to 31-3 of the request buffer circuit 30, in a one-to-one relationship. Each of the comparators 41-1 to 41-3 compares an index address outputted from the corresponding buffer of the buffers 31-1 to 31-3 with an index address in the request register 60 inputted through the line 101. Then, in a case of the coincidence, a coincidence signal is outputted to the issuance check block 20 through the line 105.

Figure 13:
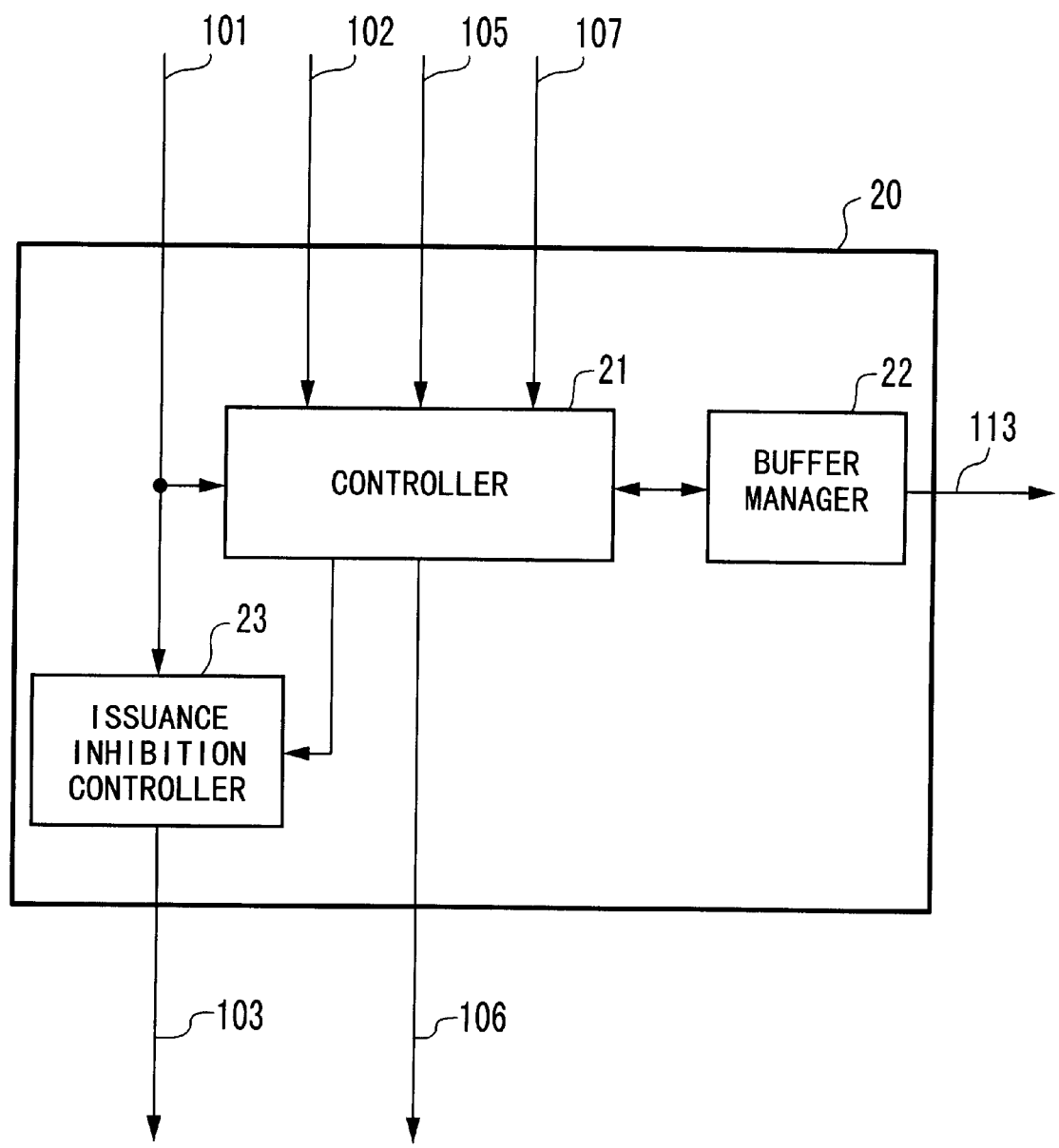
FIG. 13 is a block diagram showing a configuration example of an issuance check block in the cache memory apparatus according to the embodiment of the present invention.

FIG. 13 shows a configuration example of the issuance check block 20. The issuance check block 20 in this example includes a controller 21, a buffer manager 22 and an issuance inhibition controller 23. The buffer manager 22 is connected through the line 113 to the request buffer circuit 30. The buffer manager 22 manages the usage condition of the individual buffer (the buffers 31-1 to 31-3 of FIG. 12) in the request buffer circuit 30, and carries out a process for registering or deleting the miss request information to or from each buffer. The issuance inhibition controller 23 sends the content of the request register 60 inputted through the line 101, through the line 103 to the issuance control circuit 50, and whether or not it is sent is determined in accordance with a command from the controller 21. The controller 21 receives the content of the request register 60 through the line 101, the hit/miss signal of the cache block 10 through the line 102, the check signal from the address check circuit 40 through the line 105, and the memory data control signal from the main memory through the line 107, respectively. Also, the controller 21 controls the buffer manager 22 and the issuance inhibition controller 23, and further sends an issuance request requirement, a following instruction issuance inhibition requirement and the like, to the processor core through the line 106.

Figure 14:
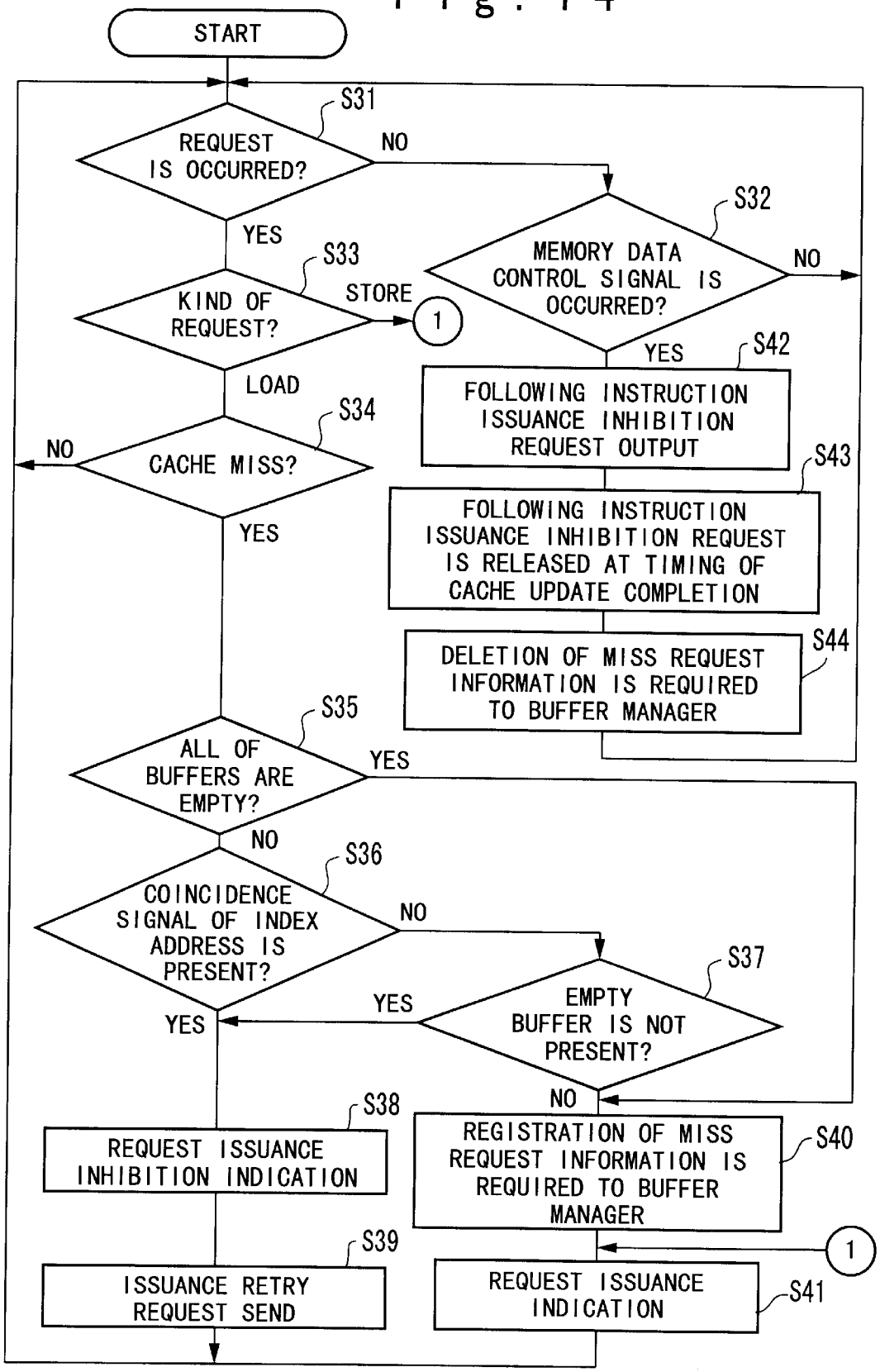
FIG. 14 is a flowchart showing a processing example of a controller within the issuance check block in the cache memory apparatus according to the embodiment of the present invention.

FIG. 14 is a flowchart showing a processing example of the controller 21. The controller 21 monitors whether or not the request occurs on the line 101, and whether or not the memory data control signal occurs on the line 107 (Step S31, Step S32).

If the request occurs on the line 101 (YES at S31), the controller 21 determines the kind of the request. If it is the load request, the controller 21 monitors the hit/miss signal sent from the cache block 10 through the line 102 (Step S34). If it is the hit, (NO at Step S34), the control is returned back to the step S31.

If it is the cache miss (YES at Step S34), the controller 21 refers to the usage state of each buffer in the request buffer circuit 30 managed by the buffer manager 22, and judges whether or not all of them are empty (namely, whether or not there is no leading miss request) (Step S35). If there is not any empty buffer (NO at Step S35), the controller 21 investigates whether or not the coincidence signal of the index address is sent from the address check circuit 40 through the line 105 (Step S36). Then, if the coincidence signal is sent (YES at Step S36), or if the empty buffer is not present in the request buffer circuit 30 even if the coincidence signal is not sent (YES at Step S37), the controller 21 indicates the issuance inhibition controller 23 to stop the issuance of the request (Step S38), and outputs the issuance retry request to the processor core through the line 106 (Step S39). Then, the control is returned back to the step S31. The issuance inhibition controller 23, since the stop of the issuance of the request is not indicated, does not send the content of the load request on the line 101 to the issuance control circuit 50.

If all of the buffers in the request buffer circuit 30 are empty (YES at Step S35), or if the coincidence between the index addresses are not detected even when all of them are not empty, and there is an empty buffer (NO at Step S37), the controller 21 sends the content of the load request at this time to the buffer manager 22, and requires the registration of the miss request information (Step S40), and then instructs the issuance inhibition controller 23 to issue the request (Step S41). Then, the control is returned back to the step S31. The buffer manager 22 selects one empty buffer in the request buffer circuit 30, and writes the miss request information to the selected buffer, and then manages the buffer as the course of the usage. Also, the issuance inhibition controller 23 sends the content of the load request to the issuance control circuit 50 through the line 103. Thus, the issuance control circuit 50 issues the miss request to the main memory.

If the occurrence request is the store request (Step S33), the controller 21 instructs the issuance inhibition controller 23 to issue the request (Step S41). Then the control is returned back to the step S31. The issuance inhibition controller 23 sends the content of the store request to the issuance control circuit 50 through the line 103. Thus, the issuance control circuit 50 issues the store request to the main memory.

On the other hand, if the memory data control signal is generated on the line 107 (YES at Step S32), the controller 21 outputs the following instruction issuance inhibition request to the processor core through the line 106 (Step S42), and releases the following instruction issuance inhibition request being sent to the line 106, at a timing when the update of the data array 11 in the cache block 10 is completed (Step S43). Next, the controller 21 reports the tag address and the index address in the address of the memory data control signal to the buffer manager 22 to instruct the deletion of the miss request information in the corresponding buffer (Step S44). After that, the control is returned back to the step S31. The buffer manager 22 clears the content of the buffer in the request buffer circuit 30 in which the addresses including the reported tag address and index address are registered to thereby delete the miss request information. Thus, the usage state of the buffer is returned back to the empty state.

As mentioned above, the present invention has been described with reference to the embodiments. However, the present invention is not limited to the embodiment. Other various additions and modifications can be made. Of course, the processes in the embodiment can be designed so as to be stored in advance as a control program in a record medium (not shown) which can be mechanically read, and this control program is then read by a computer to perform the execution control.

As mentioned above, according to the present invention, it is possible to sufficiently use the feature of the non-blocking type cache, in which the process for the following instruction can be continued even while the request of reading out the data caused by the cache miss is sent to the main memory. Thus, it is possible to improve the performance of the cache.

What is claimed is:

1. A cache update control system employing a non-blocking type cache, comprising:
   a main memory which stores main memory data;
   a data array which stores a data block comprising part of the main memory data stored in said main memory;
   an address array which stores an address corresponding to said data block stored in said data array;
   a hit judgment circuit which judges, in response to a load request issued from a processor core, whether or not a miss occurs; and
   a control unit which issues a read request to said main memory when said hit judgment circuit judges an occurrence of the miss, and updates said address array and said data array after receiving the main memory data read from said main memory,
   wherein a following load request is processed and unaffected by said non-blocking type cache while said control unit waits for a response from said main memory after issuing said read request.

2. The cache update control system according to claim 1, wherein said control unit includes a request buffer circuit which stores miss request information corresponding to the miss when said hit judgment circuit judges the occurrence of the miss.

3. The cache update control system according to claim 2, wherein said control unit outputs an issuance retry request to request re-issuance of the load request to said processor core when said hit judgment circuit judges the occurrence of the miss and an address contained in the miss request information corresponding to the judged miss coincides with an address contained in the miss request information stored in said request buffer circuit.

4. The cache update control system according to claim 3, further comprising:
   an issuance check block which inhibits a following load request from being issued from said processor core in a period from a time of receiving the main memory data from said main memory until the update of said data array and said address array is completed.

5. The cache update control system according to claim 4, wherein said control unit updates said address array based on the miss request information stored in said request buffer circuit and updates said data array based on the main memory data read from said main memory during said period.

6. The system of claim 2, wherein the control unit comprises an address check circuit that compares an index address in an address of the miss request held by the request buffer circuit with an index address in an address of a following load request.

7. The system of claim 1, wherein the control unit comprises an issuance control circuit that controls the issuance of a request to the main memory in response to a miss.

8. The system of claim 1, wherein the control unit comprises a request register that holds an access request from a processor core.

9. A cache update method for a non-blocking type cache comprising:
   storing main memory data in a main memory;
   storing a data block comprising a part of the main memory data stored in said main memory in a data array;
   storing an address corresponding to said data block stored in said data array in an address array;
   judging, in response to a load request issued from a processor core, whether or not a miss occurs;
   issuing a read request to said main memory when an occurrence of the miss is judged; and
   updating said address array and said data array after receiving the main memory data read from said main memory, wherein a following load request is processed and unaffected by said non-blocking type cache while said control unit waits for a response from said main memory after issuing said read request.

10. The cache update method according to claim 9, further comprising:
storing miss request information corresponding to the miss when the occurrence of the miss is judged.

11. The cache update method according to claim 10, further comprising:
outputting an issuance retry request to request re-issuance of the load request to said processor core when the occurrence of the miss is judged and an address contained in the miss request information corresponding to the judged miss coincides with an address contained in the stored miss request information.

12. The cache update method according to claim 11, further comprising:
inhibiting a following load request from being issued from said processor core in a period from a time of receiving the main memory data from said main memory until the update of said data array and said address array is completed.

13. The cache update method according to claim 12, wherein said updating comprises:
updating said address array based on the stored miss request information during said period; and
updating said data array based on the main memory data read from said main memory during said period.

14. A cache update control system for a non-blocking type cache comprising:

means for storing main memory data in a main memory;
means for storing a data block comprising a part of the data stored in the main memory;
means for storing an address corresponding to said data block in an address array;
means for determining a miss in response to a load request from a processor core;
means for issuing a read request to said main memory in response to a miss determination; and
means for updating the address array after receiving the main memory data from the main memory in response to the read request,
wherein a following load request is processed and unaffected by said non-blocking type cache while said control unit waits for a response from said main memory after issuing said read request.

15. The system of claim 14, further comprising means for storing miss request information corresponding to a miss.

16. The system of claim 15, further comprising means for outputting an issuance retry request to request re-issuance of a load request to a processor core in response to a miss and when an address contained in the miss request coincides with an address contained in the stored miss request information.

17. The system of claim 16, further comprising means for inhibiting a following load request from being issued from said processor core in a period of time of receiving the main memory data from said main memory until update of said data array and said address array is completed.

* * * * *